Dec. 14, 1926.
C. S. CRICKMER
1,610,602
SWIVEL JOINTED VALVE CONNECTION
Filed Feb. 28, 1925
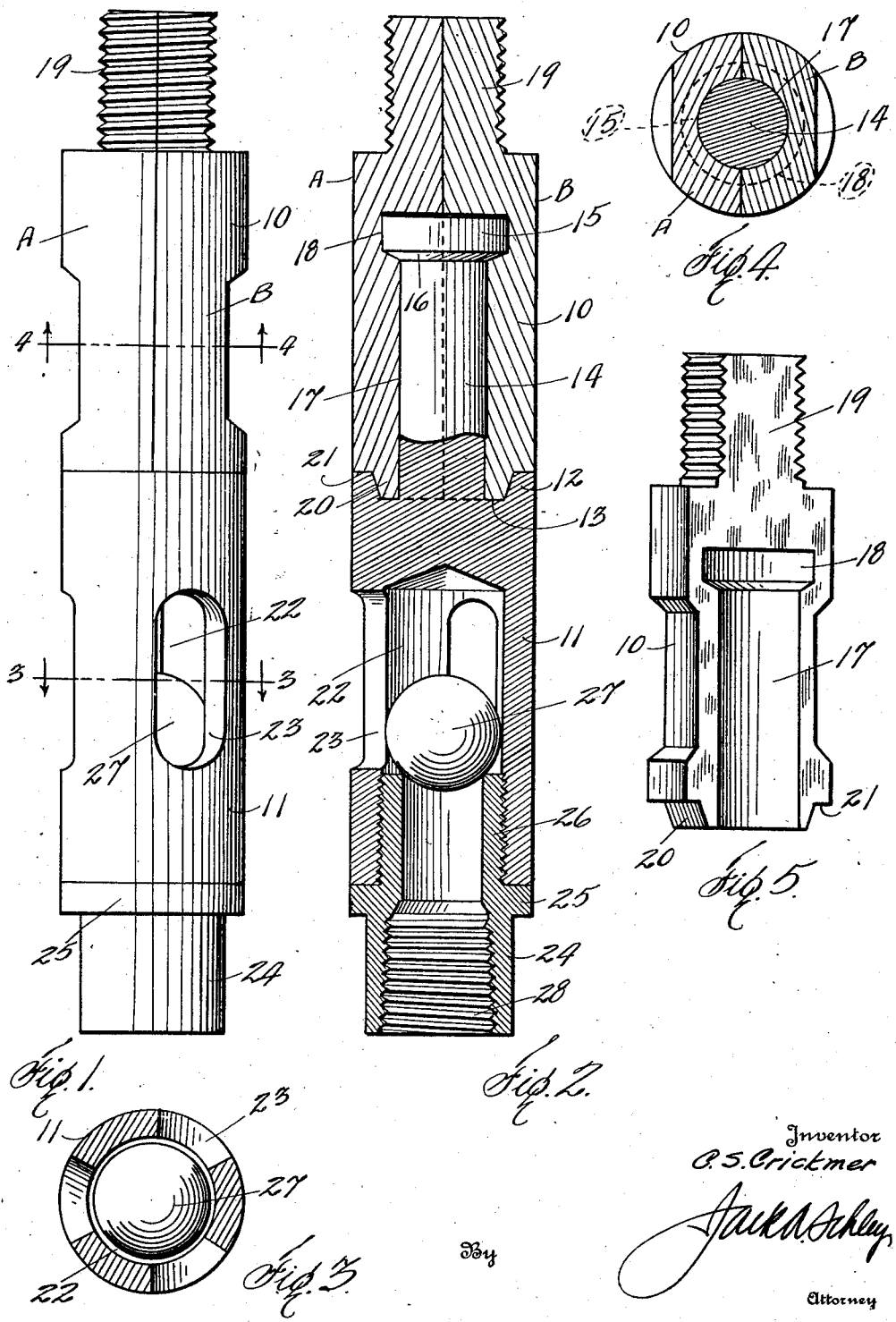
Inventor
C. S. Crickmer
By Jack N. Ochley
Attorney Patented Dec. 14, 1926.

1,610,602

UNITED STATES PATENT OFFICE.

CHARLES S. CRICKMER, OF DALLAS, TEXAS, ASSIGNOR TO THE GUIBERSON CORPORATION, OF DALLAS, TEXAS, A CORPORATION OF DELAWARE.

SWIVEL-JOINTED-VALVE CONNECTION.

Application filed February 28, 1925. Serial No. 12,267.

This invention relates to new and useful improvements in swivel jointed valve connections.

The object of the invention is to provide in combination with a swivel joint a valve housing, whereby a more compact structure may be produced; as well as the number of parts reduced.

A further object is to utilize the valve housing as a coupling member to unite the sections of the upper swivel member.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is an elevation of a connection constructed in accordance with my invention, Fig. 2 is a vertical sectional view of the same, Fig. 3 is a cross-sectional view on the line 3—3 of Fig. 1, Fig. 4 is a cross-sectional view on the line 4—4 of Fig. 1, and Fig. 5 is an isometrical view of one of the complementary sections of the upper swivel member.

In the drawing the numeral 10 designates an upper swivel member and 11 a combined valve housing and lower swivel member. The housing 11 has an annular lip 12 at its upper edge surrounding a groove 13. An axial cylindrical mandrel 14 extends upwardly from the center of the member 11 and is surrounded at its base by the said groove. This mandrel may be integral with the housing or it may be made separately and fastened thereto. At its upper end the mandrel has an enlarged circular head 15 having an under cut bevelled shoulder 16.

The swivel member 10 is formed in two complementary vertical sections A and B, respectively, semi-circular in cross-section. For convenience the swivel member will be described as an entirety. Said member has an axial bore 17 in which the mandrel 14 has a turning fit. At its upper end the bore is formed with a countersunk groove 18 shaped to receive the head 15 and the shoulder 16. The bore is surrounded by a depending annular flange 20 seating in the groove 13 of the housing 11. The inner periphery of the lip 12 and the outer surface of the flange are bevelled to a turning fit. The flange is surrounded by a flat annular shoulder 21 directed outwardly therefrom. This shoulder is complementary to the upper surface of the lip 12. It will be seen the upper end of the housing has a turning or rotating fit in and against the lower end of the swivel member, so that either member has ample bearing surfaces for taking the end or longitudinal thrust. The lip 12 acts to hold the sections A and B together at their lower ends, while the socket (not shown) into which the pin 19 fits, holds the upper ends of said sections.

The housing 11 is cored or bored out to form a valve chamber 22 having vertical openings 23 in the side walls of the housing. A coupling member 24 has an outwardly directed flange 25 intermediate its ends. An externally threaded bushing 26 extends upwardly from the flange and engages in the lower end of the chamber 22. The upper end of the bushing 26 terminates just below the openings 23 and forms a seat for a ball valve 27 confined for vertical movement in the chamber 22. The coupling member is formed with an internally screw threaded socket 28. It is to be understood that the particular type of valve or the exact structure of the coupling member is not essential to the invention. The construction of swivel coupling before described is disclosed in my allowed application Serial No. 713,408 filed May 15, 1924 as applied to a rod coupling, and the present application covers the specific embodiment of such coupling in a combined valve housing and swivel member.

In using the connection the pin 19 is screwed into a component member and the socket 28 receives a tubular conductor (not shown) through which a fluid is conveyed to the valve. The device is useful in pumping oil wells and for other purposes.

Various changes in the size and shape of the different parts, as well as modifications and alterations may be made within the scope of the appended claim.

What I claim, is:

As an article of manufacture, a tubular valve housing adapted to form a member of a swivelled coupling, said tubular valve housing being formed with a solid head and apertured sides and having an axial headed mandrel extending upwardly from the head and having a peripheral lip surrounding the mandrel forming a groove adjacent the latter.

In testimony whereof I affix my signature.

CHARLES S. CRICKMER.